(12) United States Patent
Rambo (10) Patent No.: US 12,172,758 B2
(45) Date of Patent: Dec. 24, 2024

(54) SYSTEM AND METHOD FOR COOLING AIRCRAFT COMPONENTS

(71) Applicant: General Electric Company, Schenectady, NY (US)

(72) Inventor: Jeffrey Douglas Rambo, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/069,034

(22) Filed: Oct. 13, 2020

(65) Prior Publication Data

US 2022/0111968 A1 Apr. 14, 2022

(51) Int. Cl.
*B64D 13/08* (2006.01)
*B64D 13/02* (2006.01)
*B64D 13/06* (2006.01)
*F02C 6/08* (2006.01)

(52) U.S. Cl.
CPC .............. *B64D 13/08* (2013.01); *B64D 13/02* (2013.01); *B64D 2013/0618* (2013.01); *F02C 6/08* (2013.01); *F05D 2220/323* (2013.01)

(58) Field of Classification Search
CPC ...... B64D 13/08; B64D 13/006; B64D 13/02; B64D 33/04; B64D 2013/0611; B64D 2013/0618; B64D 2013/0688
See application file for complete search history.

(56) References Cited

U.S. PATENT DOCUMENTS

| 3,089,311 A | 5/1963 | Lehmer |
| 4,424,857 A | 1/1984 | Linde |
| 4,539,816 A * | 9/1985 | Fox ...................... B01D 53/002 62/402 |

(Continued)

FOREIGN PATENT DOCUMENTS

| CA | 3028661 A1 | 1/2018 |
| CN | 109328259 A | 2/2019 |

(Continued)

OTHER PUBLICATIONS

Aviation Hunt, How Does Air Conditioning Work on an Airplane? AviationHunt, Aircraft Systems, Sep. 12, 2020, 5 pages. https://www.aviationhunt.com/aircraft-air-conditioning-system/.

(Continued)

*Primary Examiner* — Gordon A Jones
(74) *Attorney, Agent, or Firm* — Dority & Manning, P.A.

(57) ABSTRACT

A system for cooling aircraft components includes a compressor configured to receive air bled from a gas turbine engine and compress the received air. Additionally, the system includes a water separator configured to receive the compressed air from the compressor and remove moisture from the compressed air to dry the compressed air. Furthermore, the system includes a turbine configured to receive the dried air from the heat exchanger, with the dried air expanding as the dried air flows through the turbine. Moreover, the system includes a defroster configured to receive the expanded air from the turbine, with the defroster further configured to capture frozen particulate matter from the expanded air. As such, the moisture removed from the compressed air by the water separator is routed to the defroster to melt the captured frozen particulate matter.

15 Claims, 9 Drawing Sheets

(56) References Cited

U.S. PATENT DOCUMENTS

| | | | |
|---|---|---|---|
| 4,829,775 A | 5/1989 | Defrancesco | |
| 5,365,863 A | 11/1994 | D'Souza | |
| 5,906,111 A * | 5/1999 | Lui | B64D 13/06 62/402 |
| 6,128,909 A * | 10/2000 | Jonqueres | B64D 13/06 62/93 |
| 6,148,622 A * | 11/2000 | Sanger | B64D 13/06 62/88 |
| 6,331,195 B1 | 12/2001 | Faust et al. | |
| 6,681,592 B1 * | 1/2004 | Lents | B64D 13/06 62/401 |
| 6,925,802 B2 | 8/2005 | Arnold | |
| 7,502,717 B2 | 3/2009 | Elpern et al. | |
| 7,527,481 B2 | 5/2009 | Baryshnikov et al. | |
| 7,905,259 B2 | 3/2011 | Johnson et al. | |
| 7,921,869 B2 | 4/2011 | Surawski | |
| 7,959,710 B2 | 6/2011 | Olsen et al. | |
| 8,015,788 B2 | 9/2011 | Stephenson et al. | |
| 8,079,407 B2 | 12/2011 | Fellague et al. | |
| 8,567,201 B2 | 10/2013 | Dalton | |
| 8,707,702 B2 | 4/2014 | Garbe et al. | |
| 9,261,025 B2 * | 2/2016 | Dooley | F02C 7/228 |
| 9,366,180 B2 | 6/2016 | Birley et al. | |
| 9,644,643 B2 | 5/2017 | Bizzarro | |
| 9,650,147 B2 | 5/2017 | Selchert et al. | |
| 10,604,263 B2 * | 3/2020 | Bruno | B64D 13/08 |
| 2003/0037547 A1 * | 2/2003 | Bakran | F02C 6/16 60/659 |
| 2006/0225425 A1 | 10/2006 | Kobayashi et al. | |
| 2013/0061617 A1 | 3/2013 | Borghese et al. | |
| 2014/0020426 A1 | 1/2014 | Nold et al. | |
| 2015/0089953 A1 | 4/2015 | Ellsworth et al. | |
| 2015/0184593 A1 | 7/2015 | Kraft et al. | |
| 2016/0123229 A1 | 5/2016 | Tang et al. | |
| 2016/0311551 A1 | 10/2016 | Daniello | |
| 2017/0184027 A1 | 6/2017 | Moniz et al. | |
| 2017/0370291 A1 | 12/2017 | Rambo | |
| 2018/0215474 A1 * | 8/2018 | DeFrancesco | B64D 13/04 |
| 2020/0355121 A1 * | 11/2020 | O'Meallie | F02C 7/36 |

FOREIGN PATENT DOCUMENTS

| | | |
|---|---|---|
| EP | 0903484 A2 | 3/1999 |
| GB | 774415 A | 5/1957 |
| JP | 2004090777 A | 3/2004 |
| WO | WO2013116185 A1 | 8/2013 |
| WO | WO2018/004802 A1 | 1/2018 |

OTHER PUBLICATIONS

Makris, Air Cycle Cooling Pack, 2020, 6 Pages. Retrieved Sep. 18, 2020 from: https://www.k-makris.gr/cooling-pack/.

Schmidt et al., Dynamic Design of a Cryogenic Air Separation Unit, Lehigh University, 2013, 41 Pages. https://patents.google.com/scholar/79635859780293753897q=%2f%2fwww.ranchcryogenics.com%2fresources%2fbasic-air-separation-unit-description%2f&scholar.oq=https:%2f%2fwww.ranchcryogenics.com%2fresources%2fbasic-air-separation-unit-description%2f.

Ranch Cryogenics, Inc., What is an Air Separation Unit (ASU), RCI Mechanical, 2019, 4 pages. Retrieved from: https://www.ranchcryogenics.com/resources/basic-air-separation-unit-description/.

\* cited by examiner

SYSTEM AND METHOD FOR COOLING AIRCRAFT COMPONENTS

FIELD

The present disclosure generally pertains to cooling systems and methods and, more particularly, to a system and method for cooling aircraft components.

BACKGROUND

Aircraft typically include systems for cooling various components, such as generators, electronic devices, and/or the like. More specifically, the cooling systems receive a flow of air (e.g., air bled from a gas turbine engine of the aircraft), cool the flow of air, and supply the cooled flow of air to the aircraft components. Such cooling systems can generate subfreezing air, which may cause any moisture present within the air to freeze and form ice. As such, many aircraft component cooling systems include a water separator. The water separator, in turn, removes moisture from the air before the air reaches a subfreezing temperature to reduce the formation of ice.

In recent years, the cooling requirements of aircraft components have increased dramatically. As such, aircraft component cooling systems have been designed to generate increasingly colder air. In some configurations, such cooling systems can generate air that is sufficiently cold enough for any carbon dioxide and/or residual hydrocarbons therein to freeze. Like ice, the frozen carbon dioxide and hydrocarbons can result in increased wear of the component(s) being cooled or block flow passages in components such as heat exchangers. However, current moisture control systems utilize condensers and separators to remove water upstream of expansion turbines. However, temperatures sufficiently cold to precipitate carbon dioxide and hydrocarbons are generated in the cooling turbines downstream of the moisture control systems. As such, current moisture control systems are incapable of protecting the thermal loads being cooled by air cycle systems from condensed carbon dioxide and hydrocarbon particles.

Accordingly, an improved system and method for cooling aircraft components would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a system for cooling aircraft components. The system includes a compressor configured to receive air bled from a gas turbine engine and compress the received air. Additionally, the system includes a water separator configured to receive the compressed air from the compressor and remove moisture from the compressed air to dry the compressed air. Furthermore, the system includes a turbine configured to receive the dried air from the heat exchanger, with the dried air expanding as the dried air flows through the turbine. Moreover, the system includes a defroster configured to receive the expanded air from the turbine, with the defroster further configured to capture frozen particulate matter from the expanded air. As such, the moisture removed from the compressed air by the water separator is routed to the defroster to melt the captured frozen particulate matter.

In a further aspect, the present subject matter is directed to an aircraft. The aircraft includes a fuselage, a pair of wings extending outward from the fuselage, and a gas turbine engine configured to generate thrust to propel the aircraft. Additionally, the aircraft includes a compressor configured to receive air bled from the gas turbine engine and compress the received air. Furthermore, the aircraft includes a water separator configured to receive the compressed air from the compressor and remove moisture from the received compressed air to dry the compressed air. Moreover, the aircraft includes a turbine configured to receive the dried air from the heat exchanger, with the dried air expanding as the dried air flows through the turbine. In addition, the aircraft includes a defroster configured to receive the expanded air from the turbine, with the defroster further configured to capture frozen particulate matter from the expanded air. In this respect, the moisture removed from the compressed air by the water separator is routed to the defroster to melt the captured frozen particulate matter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment.

Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section, and a "high-pressure turbine" may refer to the highest maximum pressure turbine within the turbine section.

In general, the present subject matter is directed to a system and method for cooling aircraft components (e.g., generators, electronic devices, and/or the like). In several embodiments, the disclosed system includes a compressor, a water separator, and a turbine. More specifically, the compressor is configured to receive air bled from a gas turbine engine (e.g., a compressor section) of an aircraft and compress the received air. The water separator is configured to receive the compressed air from the compressor and remove moisture from the compressed air to dry the compressed air. For example, the water separator may use any suitable gas-liquid separation process to dry the received air. Furthermore, the turbine is configured to receive the dried air from the water separator. As the dried air flows through the turbine, the dried air expands, thereby further cooling the expanded air.

Additionally, the disclosed system includes a defroster positioned downstream of the turbine. In general, the defroster is configured to receive the expanded air from the turbine and capture frozen particulate matter (e.g., frozen carbon dioxide, hydrocarbons, and/or the like) present within the expanded air. In this respect, the moisture removed from the compressed air by the water separator is routed to the defroster to melt the captured frozen particulate matter. In some embodiments, the removed moisture is heated before it reaches the defroster. For example, in such embodiments, the removed moisture may flow through a heat exchanger, an evaporator, or a reheater before reaching the defroster. The expanded air then flows to an aircraft component (e.g., a generator), while the melted particulate matter flows out of the defroster to a drain.

The defroster provides one or more technical advantages. As described above, carbon dioxide and hydrocarbons can freeze within the cooling air generated by many cooling systems for aircraft components. Such frozen carbon dioxide and hydrocarbons can result in increased wear of the aircraft components being cooled. Furthermore, as described above, the carbon dioxide and hydrocarbons cannot be removed by a water separator. In this respect, the disclosed system includes a defroster that captures frozen carbon dioxide and hydrocarbons from the air being supplied the aircraft components. As such, unlike conventional systems, the disclosed system allows highly cooled air (i.e., air sufficiently cool enough to freeze carbon dioxide and hydrocarbons) to be supplied to aircraft components.

Figure 1:
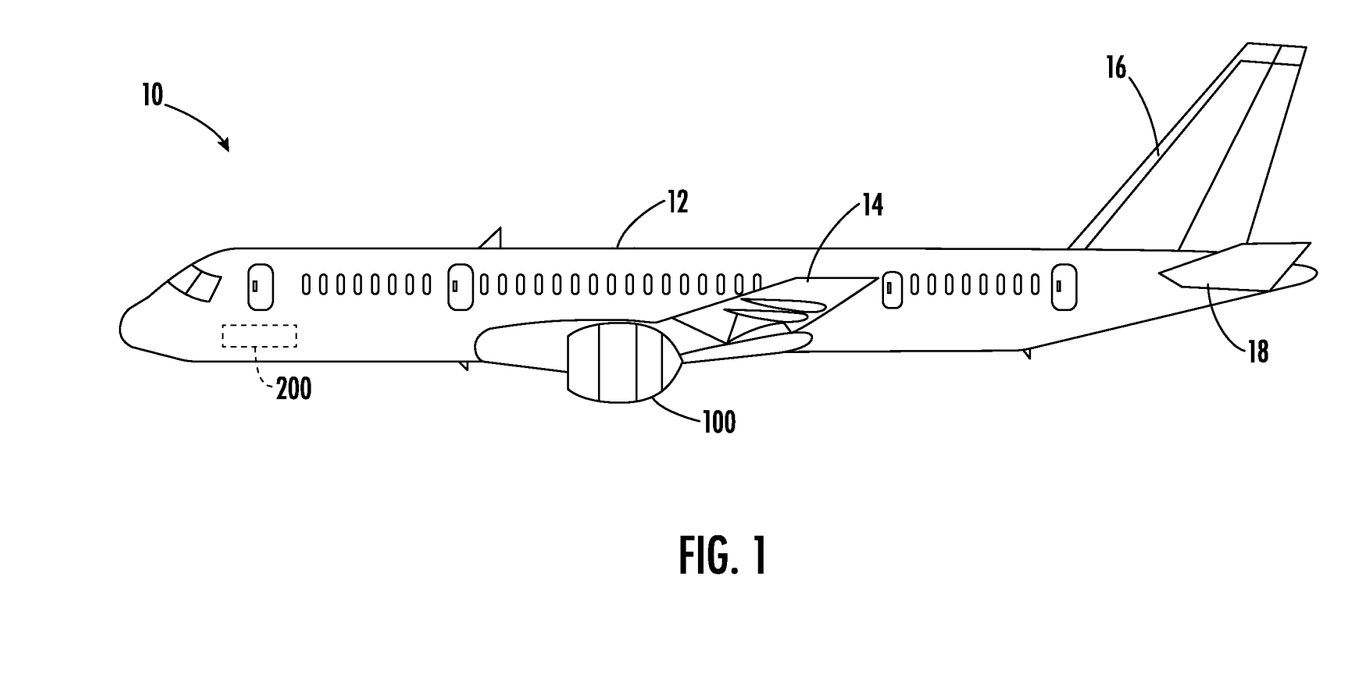
FIG. 1 is a side view of one embodiment of an aircraft.

Referring now to the drawings, FIG. 1 is a side view of one embodiment of an aircraft 10. As shown, in several embodiments, the aircraft 10 includes a fuselage 12 and a pair of wings 14 (one is shown) extending outward from the fuselage 12. In the illustrated embodiment, a gas turbine engine 100 is supported on each wing 14 to propel the aircraft through the air during flight. Additionally, as shown, the aircraft 10 includes a vertical stabilizer 16 and a pair of horizontal stabilizers 18 (one is shown). However, in alternative embodiments, the aircraft 10 may include any other suitable configuration, such as any other suitable number or type of engines.

Furthermore, the aircraft 10 may include a system 200 for cooling one or more components of the aircraft 10. For example, the system 200 is configured to cool one or more generators, electronic components (e.g., one or more navigation devices, communications devices, engine controllers, etc.), and/or the like. In this respect, as will be described below, the system 200 is configured to generate a flow of cooled air and supply this air to the aircraft component(s) being cooled. However, in alternative embodiments, the system 200 may be configured to cool any other suitable component(s) of the aircraft 10.

The configuration of the aircraft 10 described above and shown in FIG. 1 is provided only to place the present subject matter in an exemplary field of use. Thus, the present subject matter may be readily adaptable to any manner of aircraft.

Figure 2:
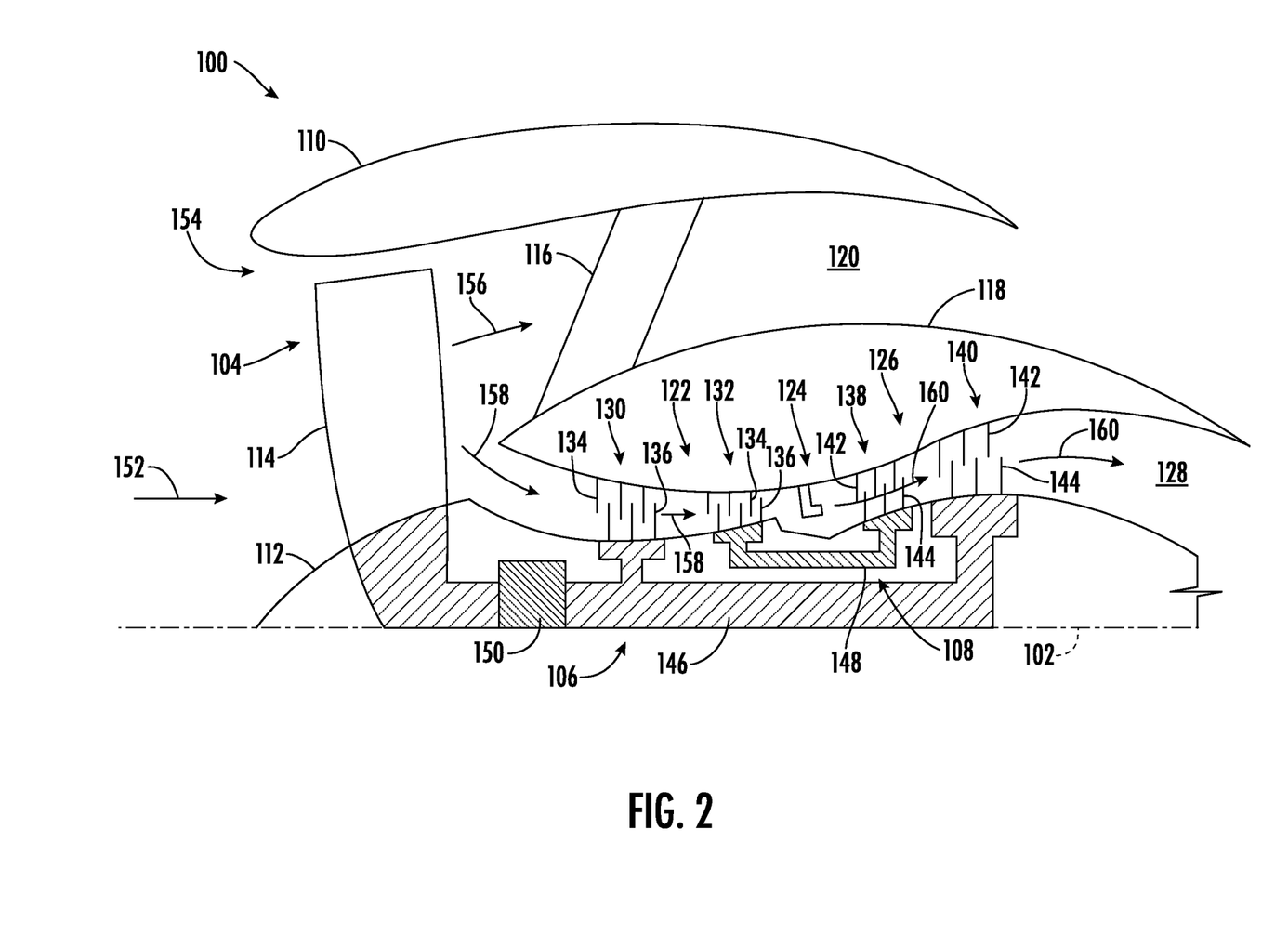
FIG. 2 is a schematic cross-sectional view of one embodiment of a gas turbine engine of an aircraft.

FIG. 2 is a schematic cross-sectional view of one embodiment of a gas turbine engine 100. In the illustrated embodiment, the engine 100 is configured as a high-bypass turbofan engine. However, in alternative embodiments, the engine 100 may be configured as a propfan engine, a turbojet engine, a turboprop engine, a turboshaft gas turbine engine, or any other suitable type of gas turbine engine.

In general, the engine 100 extends along an axial centerline 102 and includes a fan 104, a low-pressure (LP) spool 106, and a high pressure (HP) spool 108 at least partially encased by an annular nacelle 110. More specifically, the fan 104 may include a fan rotor 112 and a plurality of fan blades 114 (one is shown) coupled to the fan rotor 112. In this respect, the fan blades 114 are circumferentially spaced apart and extend radially outward from the fan rotor 112. Moreover, the LP and HP spools 106, 108 are positioned downstream from the fan 104 along the axial centerline 102. As shown, the LP spool 106 is rotatably coupled to the fan rotor 112, thereby permitting the LP spool 106 to rotate the fan 114. Additionally, a plurality of outlet guide vanes or struts 116 circumferentially spaced apart from each other and extend radially between an outer casing 118 surrounding the LP and HP spools 106, 108 and the nacelle 110. As such, the struts 116 support the nacelle 110 relative to the outer casing 118 such that the outer casing 118 and the nacelle 110 define a bypass airflow passage 120 positioned therebetween.

The outer casing 118 generally surrounds or encases, in serial flow order, a compressor section 122, a combustion section 124, a turbine section 126, and an exhaust section 128. For example, in some embodiments, the compressor section 122 may include a low-pressure (LP) compressor 130 of the LP spool 106 and a high-pressure (HP) compressor 132 of the HP spool 108 positioned downstream from the LP compressor 130 along the axial centerline 102. Each compressor 130, 132 may, in turn, include one or more rows of stator vanes 134 interdigitated with one or more rows of compressor rotor blades 136. Moreover, in some embodiments, the turbine section 126 includes a high-pressure (HP)

turbine 138 of the HP spool 108 and a low-pressure (LP) turbine 140 of the LP spool 106 positioned downstream from the HP turbine 138 along the axial centerline 102. Each turbine 138, 140 may, in turn, include one or more rows of stator vanes 142 interdigitated with one or more rows of turbine rotor blades 144.

Additionally, the LP spool 106 includes the low-pressure (LP) shaft 146 and the HP spool 108 includes a high pressure (HP) shaft 148 positioned concentrically around the LP shaft 146. In such embodiments, the HP shaft 148 rotatably couples the rotor blades 144 of the HP turbine 138 and the rotor blades 136 of the HP compressor 132 such that rotation of the HP turbine rotor blades 144 rotatably drives HP compressor rotor blades 136. As shown, the LP shaft 146 is directly coupled to the rotor blades 144 of the LP turbine 140 and the rotor blades 136 of the LP compressor 130. Furthermore, the LP shaft 146 is coupled to the fan 104 via a gearbox 150. In this respect, the rotation of the LP turbine rotor blades 144 rotatably drives the LP compressor rotor blades 136 and the fan blades 114.

In several embodiments, the engine 100 may generate thrust to propel an aircraft. More specifically, during operation, air (indicated by arrow 152) enters an inlet portion 154 of the engine 100. The fan 104 supplies a first portion (indicated by arrow 156) of the air 152 to the bypass airflow passage 120 and a second portion (indicated by arrow 158) of the air 152 to the compressor section 122. The second portion 158 of the air 152 first flows through the LP compressor 130 in which the rotor blades 136 therein progressively compress the second portion 158 of the air 152. Next, the second portion 158 of the air 152 flows through the HP compressor 132 in which the rotor blades 136 therein continue progressively compressing the second portion 158 of the air 152. The compressed second portion 158 of the air 152 is subsequently delivered to the combustion section 124. In the combustion section 124, the second portion 158 of the air 152 mixes with fuel and burns to generate high-temperature and high-pressure combustion gases 160. Thereafter, the combustion gases 160 flow through the HP turbine 138 which the HP turbine rotor blades 144 extract a first portion of kinetic and/or thermal energy therefrom. This energy extraction rotates the HP shaft 148, thereby driving the HP compressor 132. The combustion gases 160 then flow through the LP turbine 140 in which the LP turbine rotor blades 144 extract a second portion of kinetic and/or thermal energy therefrom. This energy extraction rotates the LP shaft 146, thereby driving the LP compressor 130 and the fan 104 via the gearbox 150. The combustion gases 160 then exit the engine 100 through the exhaust section 128.

The configuration of the gas turbine engine 100 described above and shown in FIG. 2 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 3:
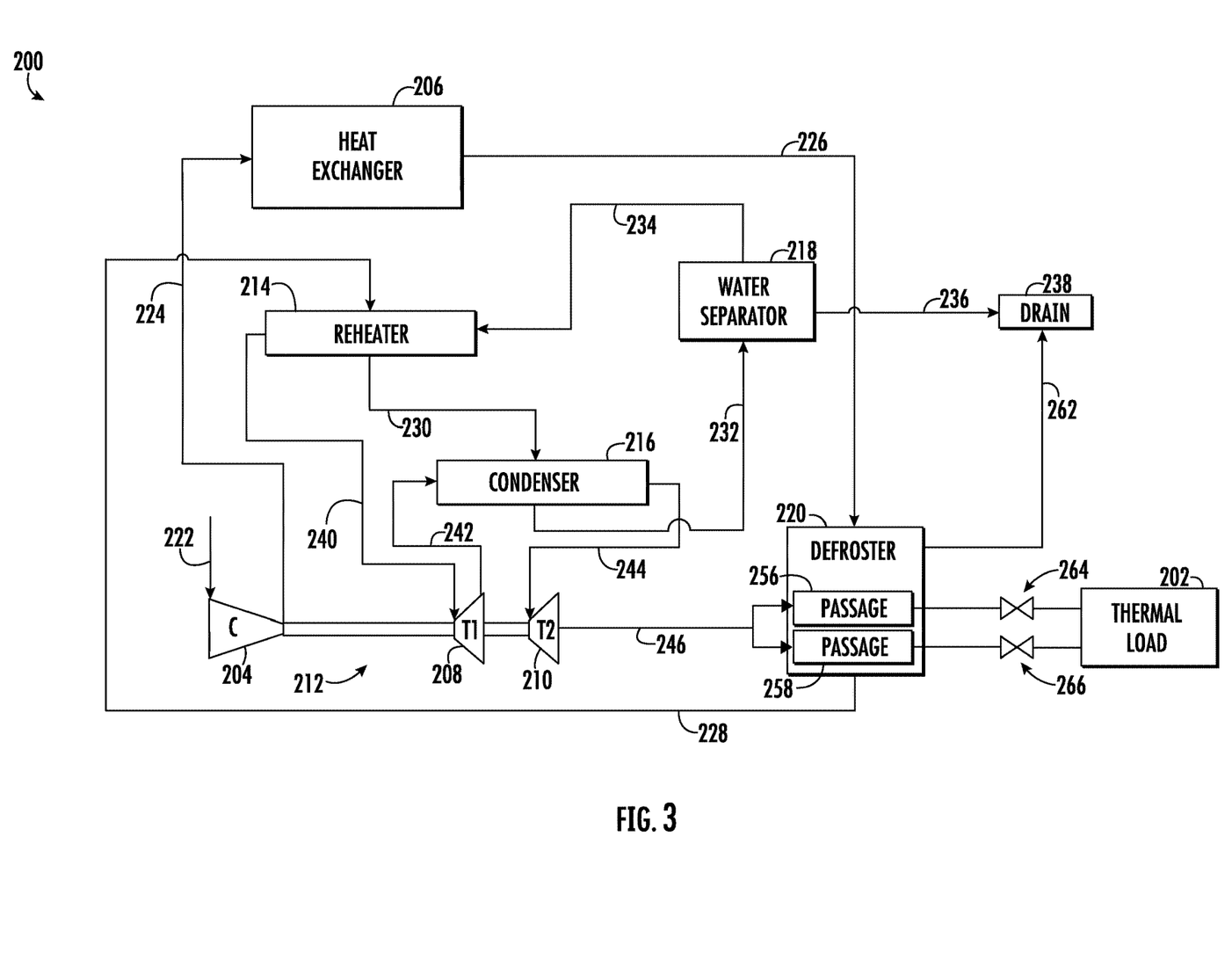
FIG. 3 is a schematic view of one embodiment of a system for cooling aircraft components.

FIG. 3 is a schematic view of one embodiment of a system 200 for cooling aircraft components. In general, the system 200 will be discussed in the context of the aircraft 10 described and shown in FIG. 1 and the gas turbine engine 100 described above and shown in FIG. 2. However, the disclosed system 200 may be implemented with any aircraft having any other suitable configuration and/or any gas turbine engine having any other suitable configuration.

In several embodiments, the system 200 may supply cooling air to a thermal load 202. In general, the thermal load 202 is the component(s) to which the system 200 supplies cooling air. In some embodiments, the thermal load 202 may correspond to one or more components of the aircraft 10, such as one or more generators, electronic components (e.g., one or more navigation devices, communications devices, engine controllers, etc.), and/or the like. However, the system 200 may be configured to supply cooling air to any suitable non-aircraft/aviation component(s).

As shown, the system 200 includes various components configured to generate a flow of cooled air. In several embodiments, the system 200 includes a compressor 204; a heat exchanger 206; and first and second turbines 208, 210. More specifically, the compressor 204 is configured to receive air bled from the gas turbine engine 100 and compress the received air. The heat exchanger 206 is configured to receive the compressed air from the compressor 204 and cool the compressed air. Moreover, the turbines 208, 210 are configured to receive the cooled air from the heat exchanger 206. As the cooled air flows through the turbines 208, 210, the cooled air expands, thereby further cooling the expanded air. In the illustrated embodiment, the system 200 includes one compressor and two turbines. However, in alternative embodiments, the system 200 may include any other suitable number of compressors and/or turbines. Additionally, the compressor 204 and the turbines 208, 210 form an auxiliary turbomachine 212, namely a turbomachine not used to generate thrust for the aircraft 10.

Furthermore, the system 200 may include additional components configured to cool or condition the compressed air generated by the compressor 204. Specifically, in several embodiments, the system 200 includes a reheater 214, a condenser 216, and a water separator 218. However, in alternative embodiments, the system 200 may include any other suitable components, such as valves, additional heat exchangers, and/or the like.

Moreover, the system 200 includes a defroster 220 positioned downstream of the turbines 208, 210. More specifically, the defroster 220 is configured to receive the expanded air from the turbines 208, 210. In this respect, as the expanded air flows through the defroster 220, the defroster 220 is configured to capture frozen particulate matter present within the expanded air. For example, such frozen particulates may include frozen carbon dioxide, frozen hydrocarbons, ice, and/or the like. Additionally, as will be described below, at least a portion of the cooled air from the heat exchanger 206 is routed to the defroster 220 to melt the captured frozen particulate matter. That is, heat is transferred from the cooled air to the frozen particulate matter to facilitate such melting.

As mentioned above, the system 200 is configured to supply cooled air to the thermal load 202. More specifically, during operation, the compressor 204 receives air (indicated by arrow 222) bled from the gas turbine engine 100. For example, such air 222 may be bled from the compressor section 122 of the engine 100. As the air 222 flows through the compressor 204, one or more rotor blades (not shown) therein compress the received air 222. The compressed air then exits the compressor 204 and flows through a conduit 224 to the heat exchanger 206. The heat exchanger 206, in turn, cools the compressed air by transferring heat from the compressed air to another fluid, such as supercritical carbon dioxide or the fuel being supplied to the engine 100. Thereafter, the cooled air exiting the heat exchanger 206 flows through a conduit 226 to the defroster 220. As will be described below, the cooled air melts any frozen particulate matter captured by the defroster 220.

In some embodiments, after flowing through the defroster 220, the cooled air is further cooled before being supplied to the first turbine 208. More specifically, as shown, the cooled air exiting the defroster 220 flows through a conduit 228 to the reheater 214. After flowing through the reheater 214, the cooled air flows through a conduit 230 to the condenser 216 and then through a conduit 232 from the condenser 216 to the water separator 218. The water separator 218 removes moisture (e.g., water or a water and mixture) from the cooled air through any suitable gas-liquid separation process. After moisture removal, the cooled air flows through a conduit 234 to the reheater 214, while the removed moisture flows through a conduit 236 to a drain 238. The reheater 214, in turn, transfers heat between the two flows of cooled air therethrough. In particular, heat is transferred from the cooled air flowing through the reheater 214 from the defroster 220 to the cooled air flowing through the reheater 214 from the water separator 218. Such heat transfer further cools the flow of cooled air from the defroster 220, while heating the flow of cooled air from the water separator 218 vaporizes any water still present within the cooled air. Thereafter, the cooled air exits the reheater 214 and flows through a conduit 240 to the first turbine 208.

Additionally, the cooled air expands while flowing through the turbines 208, 210, thereby further cooling the air. More specifically, in some embodiments, as the cooled air flows through the first turbine 208, the cooled air expands and is further cooled. The expanded air then exits the first turbine 208 and flows through a conduit 242 to the condenser 216. In this respect, the condenser 216 transfers heat between the two flows of cooled air therethrough. In particular, heat is transferred from the cooled air flowing through the condenser 216 from the reheater 214 to the expanded air flowing through the condenser 216 from the first turbine 208. Such heat transfer further cools the flow of cooled air from the reheater 214, while heating the flow of expanded air from the first turbine 208. Next, the expanded air exits the condenser 216 and flows through a conduit 244 to the second turbine 210. As the air flows through the second turbine 210, the air is further expanded and cools. The expansion of the air through the turbines 208, 210 rotates rotor blades (not shown) therein, which rotatably drive the rotor blades within the compressor 204. Thereafter, the expanded air exits the second turbine 210 and flows through a conduit 246 to the defroster 220 before being supplied to the thermal load 202 for cooling.

Figure 4:
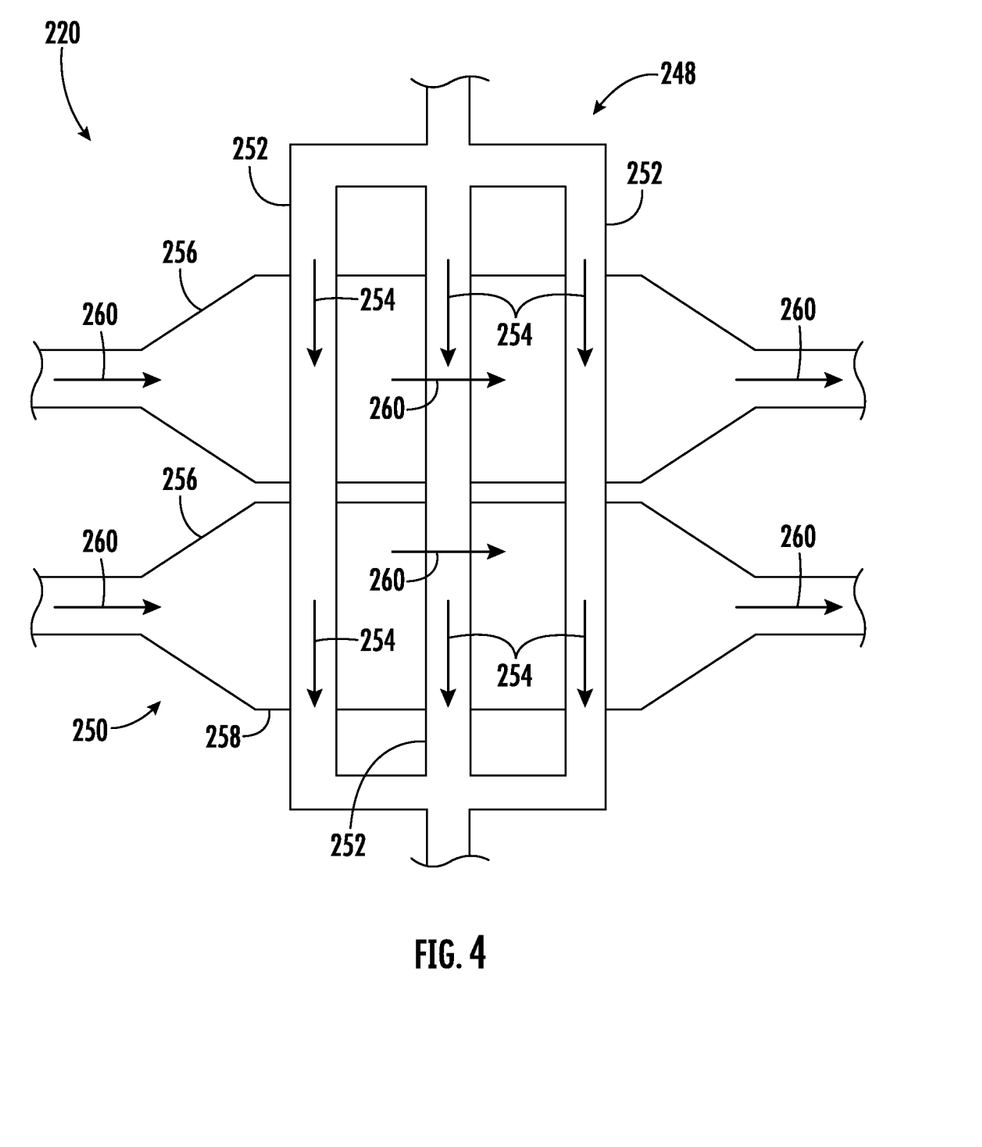
FIG. 4 is a diagrammatic view of one embodiment of a defroster of the system shown in FIG. 3.

FIGS. 3 and 4 illustrate one embodiment of the defroster 220. As shown, in several embodiments, the defroster 220 is configured as a heat exchanger. In such embodiments, the defroster 220 includes a cooled air flow path 248 and an expanded air path 250. Specifically, in the illustrated embodiment, the cooled air path 248 includes a plurality of tubes 252 through which the cooled air (indicated by arrows 254 in FIG. 4) from the heat exchanger 206 flows. Moreover, in the illustrated embodiment, the defroster 220 includes first and second passages 256, 258 through which the expanded air (indicated by arrows 260 in FIG. 4) from the second turbine 210 flows. In this respect, the tubes 252 extend through the passages 256, 268. As such, the frozen particulate matter present within the expanded air 260 is captured on or between the tubes 252. The cooled air 254 flowing through the tubes 252 melts the captured frozen particulates, which then drop out of the defroster 220 and flow through a conduit 262 to the drain 238. Although FIG. 4 illustrates three tubes 252 and two passages 256, 258, the defroster 220 may include more or less than two passages and/or more or less than three tubes. Additionally, in alternative embodiments, the defroster 220 may be configured as a screen or any other suitable device or structure capable of capturing frozen particulate matter present within the expanded air flowing through the defroster 220. Moreover, the defroster 220 may be integrated with the thermal load 202 or a thermal load heat exchanger (not shown).

Referring again to FIG. 3, in embodiments in which defroster 220 includes multiple passages through which the expanded air from the second turbine 210 can flow, the system 200 may also include a plurality of valves 264, 266. Such valves 264, 262 are positioned downstream of the defroster 220 and upstream of the thermal load 202. For example, in the illustrated embodiment, the system 200 may include a first valve 264 fluidly coupled in series to the first passage 256 of the defroster 220. Additionally, in the illustrated embodiment, the system 200 may include a second valve 266 fluidly coupled in series to the second passage 258 of the defroster 220. In this respect, when the first valve 264 is closed, the expanded air from the second turbine 210 flows through the second passage 258 of the defroster 220 to the thermal load 202. Conversely, when the second valve 266 is closed, the expanded air from the second turbine 210 flows through the first passage 256 of the defroster 220 to the thermal load 202. Thus, in such embodiments, the flow of the expanded air from the second turbine 210 to the thermal load 202 can switched between the different passages of the defroster 220. For example, when one passage of the defroster 220 becomes plugged with frozen particulate matter, the flow of the expanded air can be switched to another passage of the defroster 220 by controlling the valves 254, 256 to allow time for the plugged particulate matter to melt. In one embodiment, the valves 264, 266 may be combined into a single switching/diverter valve.

Figure 5:
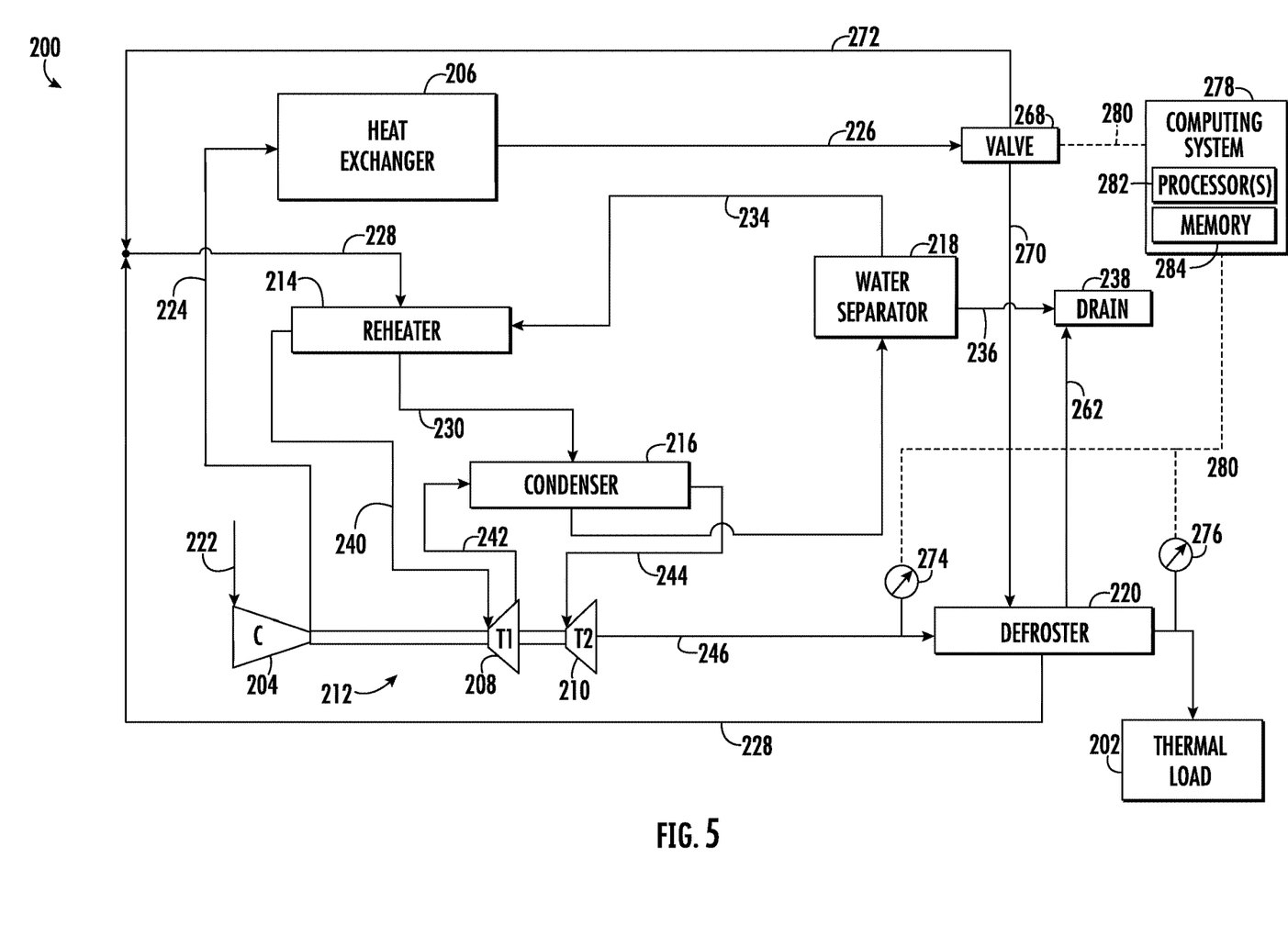
FIG. 5 is a schematic view of another embodiment of a system for cooling aircraft components.

FIG. 5 is a schematic view of another embodiment of a system 200 for cooling aircraft components. Like the embodiment shown in FIG. 3, the embodiment of the system 200 shown in FIG. 5 includes a compressor 204; a heat exchanger 206; first and second turbines 208, 210; and a defroster 220. Moreover, like the embodiment shown in FIG. 3, in the embodiment of the system 200 shown in FIG. 5, the cooled air exiting the heat exchanger 206 is supplied to the defroster 220 for melting the frozen particulate matter captured therein. However, unlike the embodiment shown in FIG. 3, the embodiment of the system 200 shown in FIG. 5 includes a valve 268 and conduits 270, 272. In general, the valve 268 is configured to control the flow of the cooled air from the heat exchanger 206 to the defroster 220. Specifically, the valve 268 is movable between a first position at which the cooled air from the heat exchanger 206 flows through the defroster 220 and a second position at which the cooled air from the heat exchanger 206 bypasses the defroster 220. As such, in operation, the cooled air exiting the heat exchanger 206 flows through the conduit 226 to the valve 268. When the valve 268 is at the first position, the cooled air flows through the conduit 270 to the defroster 220. Conversely, when the valve 268 is at the second position, the cooled air flows through the conduit 272 to the conduit 228. In such instances, the cooled air bypasses the defroster 220 and flows directly to the reheater 214. Alternatively, the valve 268 may be a diverter valve or the conduit 270 may be sized such that only a portion of the flow from the conduit 226 is directed to the defroster 220 and rejoins the flow exiting the heat exchanger 206 prior to such flow entering the reheater 228.

Additionally, in several embodiments, the system 200 includes first and second pressure sensor 274, 276. More specifically, the first pressure sensor 274 is configured to capture data indicative of the pressure of the expanded air upstream of the defroster 220 (e.g., within the conduit 246). Moreover, the second pressure sensor 276 is configured to capture data indicative of the pressure of the expanded air downstream of the defroster 220 and upstream of the thermal load 202. In this respect, the first and second pressure sensors 274, 276 may correspond to any suitable device for capturing data indicative of the pressures of the expanded air, such as piezoresistive strain gauges, electromagnetic pressure sensors, and/or the like.

Furthermore, in several embodiments, the system 200 includes a computing system 278 communicatively coupled to one or more components of the system 200 to allow the computing system 278 to electronically or automatically control the operation of such components. For instance, the computing system 278 may be communicatively coupled to the pressure sensors 274, 276 via a communicative link 280. In this respect, the computing system 278 may be configured to receive data indicative of the pressure of the expanded air upstream and downstream of the defroster 220. Moreover, the computing system 278 may be communicatively coupled to the valve 268 via the communicative link 280. As such, the computing system 278 may be configured to control the operation of the valve 268 to control the flow of the cooled air from the heat exchanger 206 to the defroster 220 based on the received pressure sensor data. Additionally, the computing system 278 may be communicatively coupled to any other suitable components of the system via the communicative link 280.

In general, the computing system 278 may comprise one or more processor-based devices, such as a given controller or computing device or any suitable combination of controllers or computing devices. Thus, in several embodiments, the computing system 278 may include one or more processor(s) 282 and associated memory device(s) 284 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 284 of the computing system 278 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 284 may generally be configured to store suitable computer-readable instructions that, when implemented by the processor(s) 282, configure the computing system 278 to perform various computer-implemented functions, such as one or more aspects of the methods and algorithms that will be described herein. In addition, the computing system 278 may also include various other suitable components, such as a communications circuit or module, one or more input/output channels, a data/control bus and/or the like.

The various functions of the computing system 278 may be performed by a single processor-based device or may be distributed across any number of processor-based devices. In such instances, such processor-based devices may form part of the computing system 278. For instance, the functions of the computing system 278 may be distributed across multiple application-specific controllers, such an engine controller, a navigation controller, a communications controller, and/or the like.

In several embodiments, the computing system 278 is configured to determine a pressure differential across the defroster 220 based on the data captured by the first and second pressure sensors 274, 276. More specifically, during operation of the system 200, the computing system 278 is configured to receive data captured by the pressure sensors 274, 276 (e.g., via the communicative link 280). The computing system 278 is configured to process/analyze the received sensor data to determine the pressures of the expanded air upstream and downstream of the defroster 220. For example, the computing system 278 may include a suitable look-up table stored within its memory device(s) 284 that respectively correlates the received pressure data to the pressures of the expanded air. Thereafter, the computing system 278 may determine the differential between the upstream and downstream pressures.

Moreover, in several embodiments, the computing system 278 is configured to control the operation of the valve 268 based on the data captured by the first and second pressure sensors. More specifically, the computing system 278 is configured to compare the determined pressure differential to a threshold value. In general, when the determined pressure differential exceeds a threshold value, the defroster 220 may be partially or fully plugged with frozen particulate matter. In such instances, the computing system 278 controls the operation of the valve 268 such that the valve 268 is at its first position. This, in turn, directs the cooled air exiting the heat exchanger 206 to flow through the defroster 220, thereby melting the frozen particulate matter and de-plugging the defroster 220. Conversely, when the determined pressure differential falls below the threshold value, it may not be necessary for the cooled air from the heat exchanger 206 to flow through the defroster 220. In such instances, the ambient air may be sufficient to melt the frozen particulate matter being captured by the defroster 220. Thus, in such instances, the computing system 278 controls the operation of the valve 268 such that the valve 268 is at its second position. This, in turn, directs the cooled air exiting the heat exchanger 206 to bypass the defroster 220 and flow directly to the reheater 214.

Figure 6:
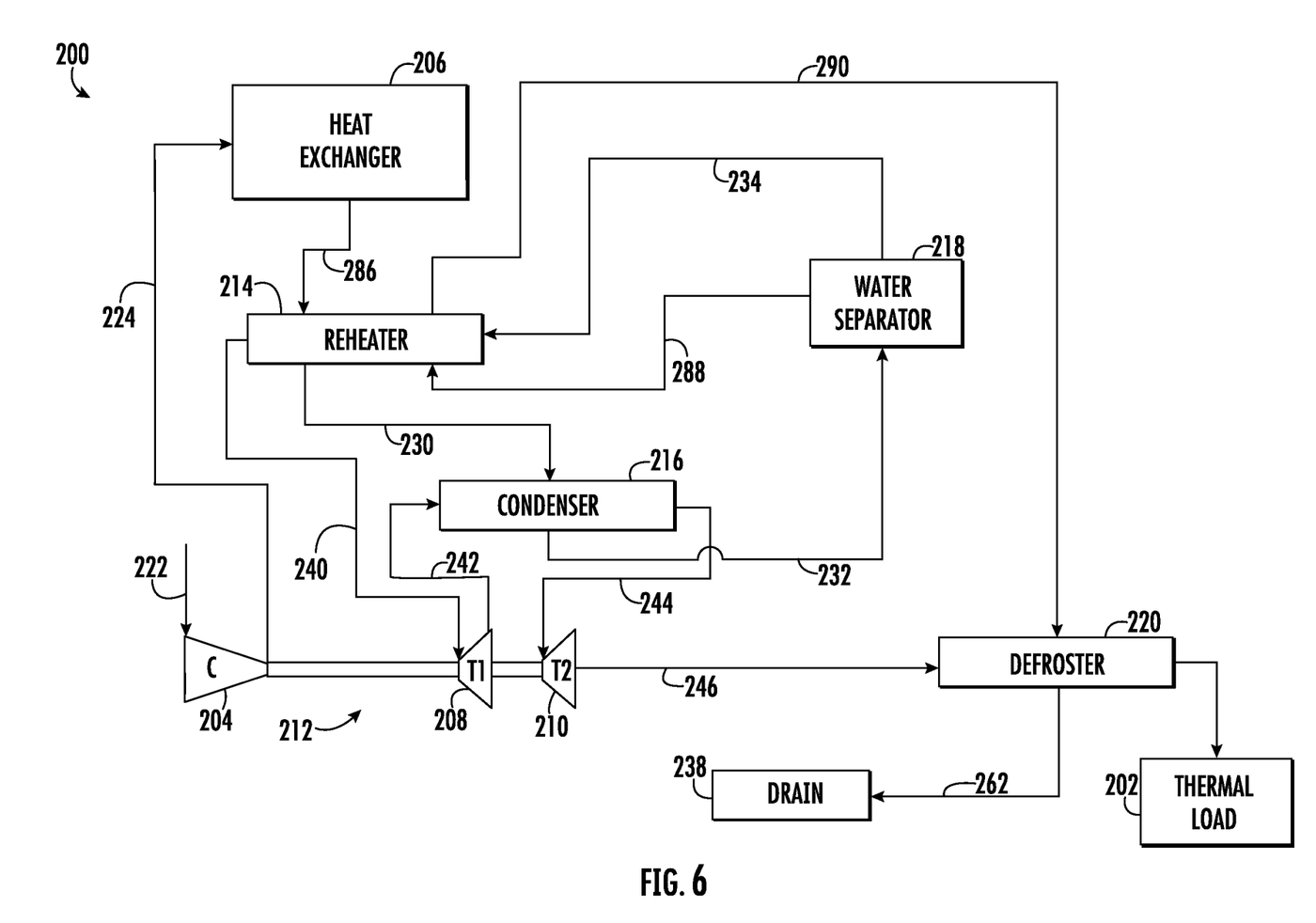
FIG. 6 is a schematic view of a further embodiment of a system for cooling aircraft components.

FIG. 6 is a schematic view of a further embodiment of a system 200 for cooling aircraft components. Like the embodiments shown in FIGS. 3 and 5, the embodiment of the system 200 shown in FIG. 6 includes a compressor 204; a heat exchanger 206; first and second turbines 208, 210; a reheater 214; and a defroster 220. However, unlike the embodiments shown in FIGS. 3 and 5, in the embodiment of the system 200 shown in FIG. 6, the cooled air exiting the heat exchanger 206 flows through a conduit 286 directly to the reheater 214. After flowing through the reheater 214, the cooled air flows through the condenser 216 to the water separator 218. As described above, the water separator 218 removes moisture from the cooled air flowing therethrough. After moisture removal, the cooled air flows back through the reheater 214 and then to the first turbine 208.

The moisture removed from the cooled air by the water separator 218 is then routed to the defroster 220 to melt any captured frozen particulate matter captured thereby. Specifically, in several embodiments, the removed moisture flows through a conduit 288 to the reheater 214 (and, more specifically, to a separate channel(s) of the reheater 214 than the dried, cooled air exiting the water separator 218). In this respect, the reheater 214 transfers heat from the cooled air flowing through the reheater 214 from the defroster 220 to the dried, cooled air flowing through the reheater 214 from the water separator 218 and the moisture flowing through the reheater 214 from the water separator 218. The heated moisture then flows through a conduit 290 to the defroster 220. As such, the moisture flows through the defroster 220 and melts any captured frozen particulate matter. Thereafter, the moisture and the melted particulate matter flow through the conduit 262 to the drain 238.

Figure 7:
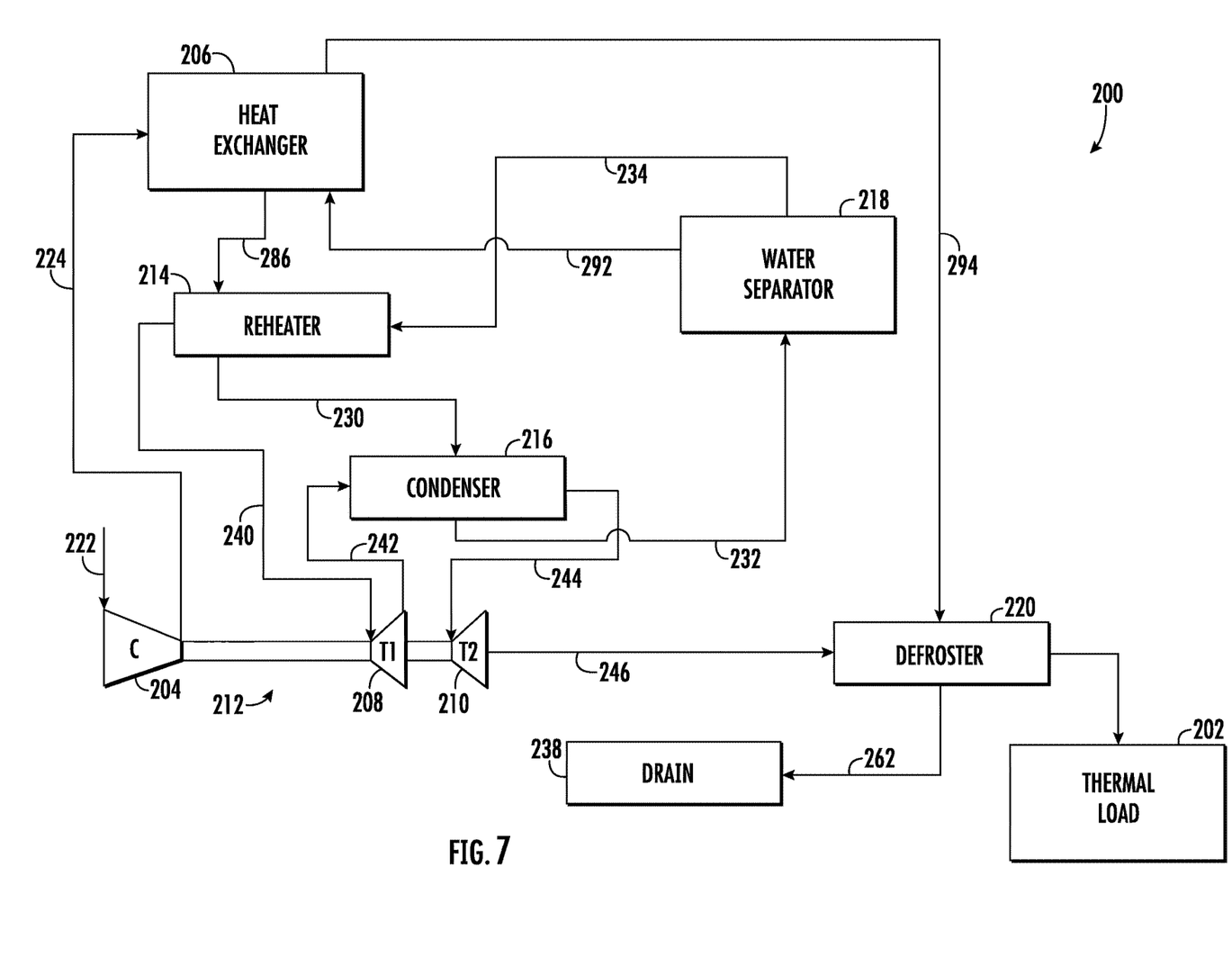
FIG. 7 is a schematic view of yet another embodiment of a system for cooling aircraft components

FIG. 7 is a schematic view of yet another embodiment of a system 200 for cooling aircraft components. Like the embodiment shown in FIG. 6, the embodiment of the system 200 shown in FIG. 7 includes a compressor 204; a heat exchanger 206; first and second turbines 208, 210; a reheater 214; a water separator 218; and a defroster 220. Moreover, like the embodiment shown in FIG. 6, in the embodiment of the system 200 shown in FIG. 7, the moisture removed from the cooled air by the water separator 218 is routed to the defroster 220 to melt any captured frozen particulate matter captured thereby. However, unlike the embodiment shown in FIG. 6, in the embodiment of the system 200 shown in FIG. 7, the moisture flows through the heat exchanger 206 before reaching the defroster 220. Specifically, in several embodiments, the removed moisture flows through a conduit 292 to the heat exchanger 206. In this respect, the heat exchanger 206 transfers heat from the compressed air flowing through the heat exchanger 206 from the compressor 204 to the moisture flowing through the heat exchanger 206 from the water separator 218. The heated moisture then flows through a conduit 294 to the defroster 220. As such, the heated moisture flows through the defroster 220 and melts any captured frozen particulate matter. Thereafter, the moisture and the melted particulate matter flow through the conduit 262 to the drain 238.

Figure 8:
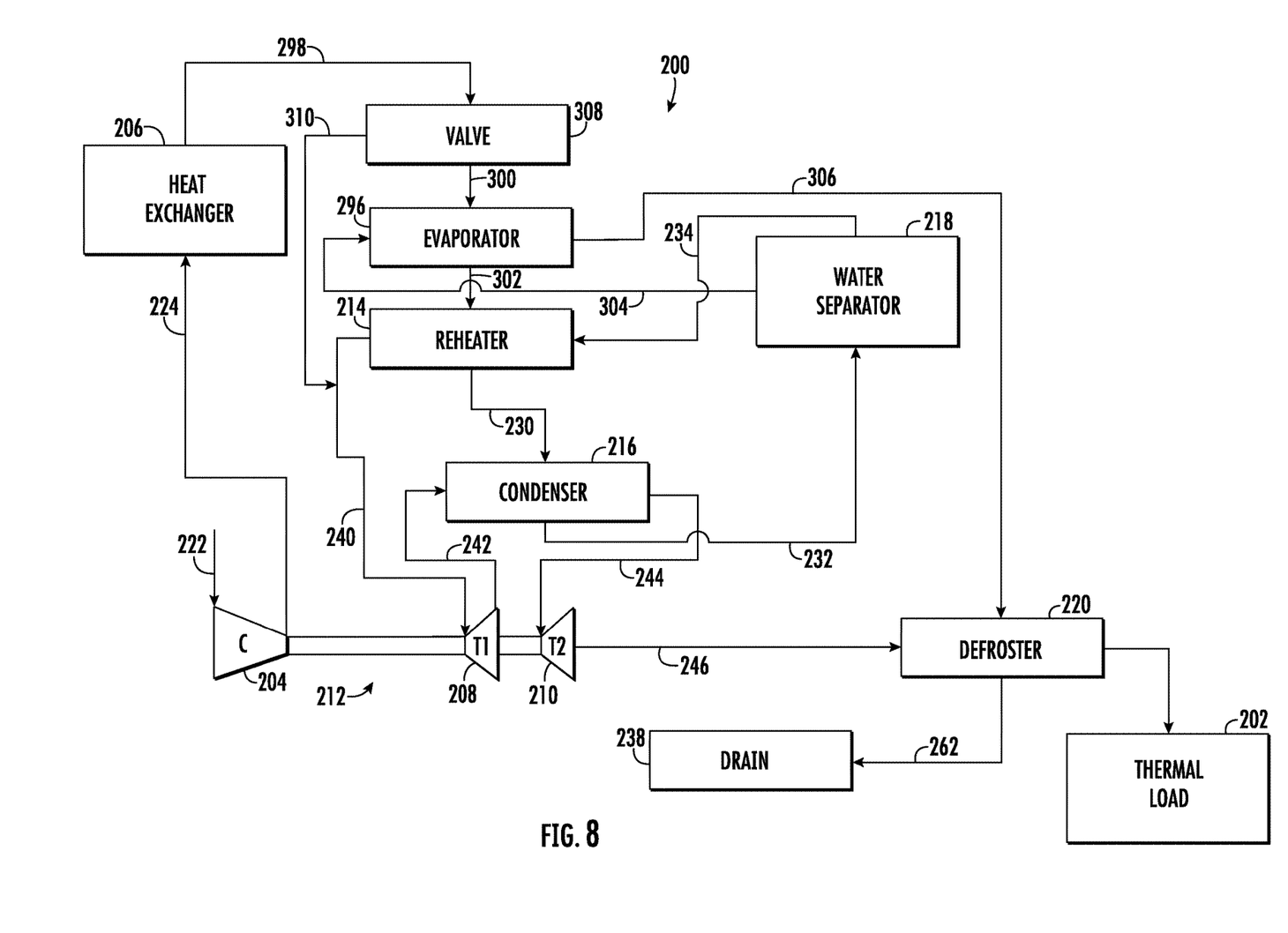
FIG. 8 is a schematic view of yet a further embodiment of a system for cooling aircraft components.

FIG. 8 is a schematic view of yet a further embodiment of a system 200 for cooling aircraft components. Like the embodiments shown in FIGS. 6 and 7, the embodiment of the system 200 shown in FIG. 8 includes a compressor 204; a heat exchanger 206; first and second turbines 208, 210; a reheater 214; a water separator 218; and a defroster 220. Moreover, like the embodiments shown in FIGS. 6 and 7, in the embodiment of the system 200 shown in FIG. 8, the moisture removed from the cooled air by the water separator 218 is routed to the defroster 220 to melt any captured frozen particulate matter captured thereby.

However, unlike the embodiments shown in FIGS. 6 and 7, in the embodiment of the system 200 shown in FIG. 8, the moisture flows through an evaporator 296 before reaching the defroster 220. Specifically, in several embodiments, the evaporator 296 is positioned downstream of the heat exchanger 206 and upstream of the reheater 214. In this respect, the cooled air exiting the heat exchanger 206 flows through conduits 298, 300 to the evaporator 296. After flowing through the evaporator 296, the cooled air flows through a conduit 302 to the reheater 214. Furthermore, the moisture removed by the water separator 218 flows through a conduit 304 to the evaporator 296. In this respect, the evaporator 296 transfers heat from the cooled air flowing through the evaporator 296 from the compressor 204 to the moisture flowing through the heat exchanger 206 from the water separator 218. The heated moisture then flows through a conduit 306 to the defroster 220. As such, the heated moisture flows through the defroster 220 and melts any captured frozen particulate matter. Thereafter, the moisture and the melted particulate matter flow through the conduit 262 to the drain 238.

Additionally, in several embodiments, the system 200 includes a valve 308 configured to control a flow of the compressed air from the compressor 204 to the evaporator 296. In such embodiments, the valve 308 is positioned downstream of the heat exchanger 206 and upstream of the evaporator 296. In this respect, the valve 308 is movable between a first position at which the cooled air from the heat exchanger 206 flows through the evaporator 296 and the reheater 214 and a second position at which the cooled air from the heat exchanger 206 bypasses the evaporator 296, the reheater 214, one side of the condenser 216, and the water separator 218 (basically the moisture control loop of the system 200). As such, in operation, the cooled air exiting the heat exchanger 206 flows through the conduit 298 to the valve 308. When the valve 308 is at the first position, the cooled air flows through the conduit 300 to the evaporator 296 and then through the conduit 302 to the reheater 214. Conversely, when the valve 308 is at the second position, the cooled air flows through a conduit 310 to the conduit 240. In such instances, the cooled air bypasses the evaporator 296 and the reheater 214 and flows directly to the first turbine 208.

Figure 9:
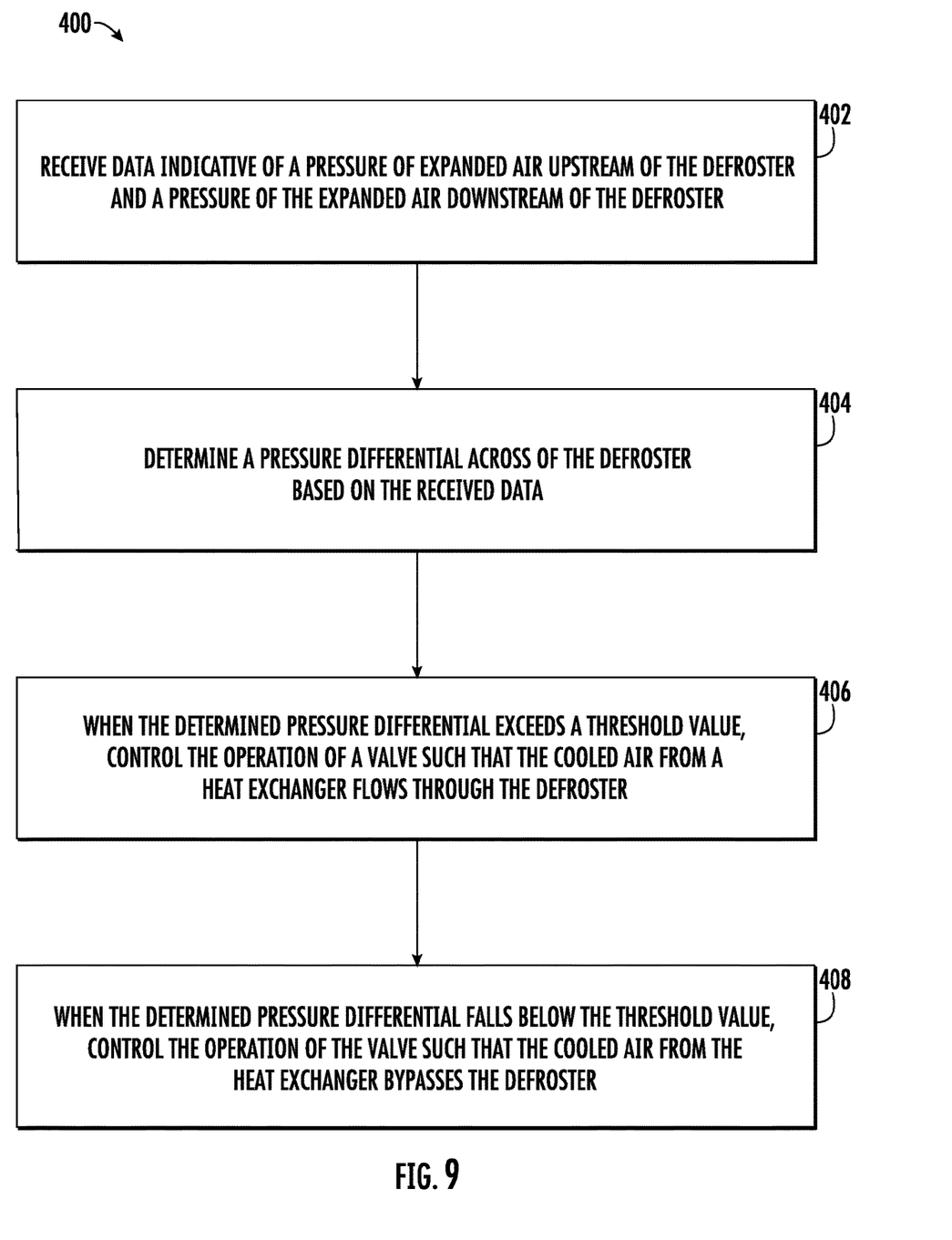
FIG. 9 is a flow diagram of one embodiment of a method for cooling aircraft components.

FIG. 9 is a flow diagram of one embodiment of a method 300 for cooling aircraft components. In general, the method 300 will be described herein with reference to the system 200 described above and shown in FIGS. 3-8. However, the disclosed method 300 may be implemented within any system having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (302), the method 300 includes receiving, with a computing system, data indicative of a pressure of expanded air upstream of a defroster and a pressure of the expanded air downstream of the defroster. For example, as described above, the computing system 278 may be configured to receive data from the first and second pressure sensors 274, 276 via the communicative link 280. Such data is, in turn, indicative of the pressures of the expanded air upstream and downstream of the defroster 220.

Additionally, at (304), the method 300 includes determining, with the computing system, a pressure differential across of the defroster based on the received data. For example, as described above, the computing system 234 may be configured to determine a pressure differential across the defroster 220 based on the received data.

Moreover, as shown in FIG. 9, at (306), when the determined pressure differential exceeds a threshold value, the method 300 includes controlling, with the computing system, an operation of a valve such that the cooled air from the heat exchanger flows through the defroster. For example, as described above, when the determined pressure differential exceeds a threshold value, the computing system 278 may be configured to control the operation of the valve 268 such that the cooled air from the heat exchanger 206 flows through the defroster 220.

Furthermore, at (308), when the determined pressure differential falls below the threshold value, the method 300 includes controlling, with the computing system, the operation of the valve such the cooled air from the heat exchanger bypasses the defroster. For example, as described above, when the determined pressure differential falls below the threshold value, the computing system 278 may be configured to control the operation of the valve 268 such that the cooled air from the heat exchanger 206 bypasses the defroster 220.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A system for cooling aircraft components, the system comprising: a compressor configured to receive air bled from a gas turbine engine and compress the received air; a water separator configured to receive the compressed air from the compressor and remove moisture from the compressed air to dry the compressed air; a turbine configured to receive the dried air from the heat exchanger, the dried air expanding as the dried air flows through the turbine; and a defroster configured to receive the expanded air from the turbine, the defroster further configured to capture frozen particulate matter from the expanded air, wherein the moisture removed from the compressed air by the water separator is routed to the defroster to melt the captured frozen particulate matter.

The system of one or more of these clauses, further comprising: a reheater configured to transfer heat between the compressed air flowing from the compressor to the water separator and the dried air flowing from the water separator to the turbine.

The system of one or more of these clauses, wherein the moisture removed from the compressed air flows through the reheater before flowing through the defroster.

The system of one or more of these clauses, wherein the reheater is configured to heat the moisture.

The system of one or more of these clauses, further comprising: a heat exchanger configured to receive the compressed air from the compressor and cool the compressed air.

The system of one or more of these clauses, wherein the moisture removed from the compressed air flows through the heat exchanger before flowing through the defroster.

The system of one or more of these clauses, wherein the heat exchanger is configured to heat the moisture.

The system of one or more of these clauses, further comprising: a reheater configured to transfer heat between the cooled air flowing from the heat exchanger to the water separator and the dried air flowing from the water separator to the turbine.

The system of one or more of these clauses, further comprising: an evaporator configured to receive the compressed air from the compressor and cool the compressed air.

The system of one or more of these clauses, wherein the moisture removed from the compressed air flows through the evaporator before flowing through the defroster.

The system of one or more of these clauses, wherein the evaporator is configured to heat the moisture.

The system of one or more of these clauses, further comprising: a heat exchanger configured to receive the compressed air from the compressor and cool the compressed air, the heat exchanger positioned upstream of the evaporator.

The system of one or more of these clauses, further comprising: a reheater configured to transfer heat between the cooled air flowing from the evaporator to the water separator and the dried air flowing from the water separator to the turbine.

The system of one or more of these clauses, further comprising: a valve positioned between the compressor and the evaporator, the valve configured to control a flow of the compressed air from the compressor to the evaporator.

The system of one or more of these clauses, wherein the valve is movable between a first position at which the compressed air from the compressor flows through the evaporator and the reheater and a second position at which the compressed air from the compressor bypasses the evaporator and the reheater.

The system of one or more of these clauses, further comprising: a drain configured to receive the melted particulate matter from the defroster.

An aircraft, comprising: a fuselage; a pair of wings extending outward from the fuselage; a gas turbine engine configured to generate thrust to propel the aircraft; a compressor configured to receive air bled from the gas turbine engine and compress the received air; a water separator configured to receive the compressed air from the compressor and remove moisture from the received compressed air to dry the compressed air; a turbine configured to receive the dried air from the heat exchanger, the dried air expanding as the dried air flows through the turbine; and a defroster configured to receive the expanded air from the turbine, the defroster further configured to capture frozen particulate matter from the expanded air, wherein the moisture removed from the compressed air by the water separator is routed to the defroster to melt the captured frozen particulate matter.

The aircraft of one or more of these clauses, further comprising: a reheater configured to transfer heat between the compressed air flowing from the compressor to the water separator and the dried air flowing from the water separator to the turbine.

The aircraft of one or more of these clauses, further comprising: a thermal load, wherein the air exiting the defroster is routed to the thermal load.

The aircraft of one or more of these clauses, further comprising: a drain configured to receive the melted particulate matter from the defroster.

What is claimed is:

1. A system for cooling aircraft components, the system comprising:
    an auxiliary turbomachine including a compressor, a first turbine, and a second turbine, wherein the compressor is configured to receive compressed air bled from a gas turbine engine;
    an evaporator disposed downstream from and fluidly coupled to the compressor;
    a condenser disposed downstream from the evaporator and in fluid communication with the compressor via the evaporator, wherein the condenser is disposed downstream from and in fluid communication with the first turbine, and wherein the condenser is disposed upstream from and in fluid communication with the second turbine;
    a water separator disposed downstream from the condenser, wherein the water separator is fluidly connected to the evaporator via the condenser; and a defroster disposed downstream from the second turbine, wherein the defroster is in fluid communication with the water separator via the evaporator.

2. The system of claim 1, further comprising:
a reheater, wherein the reheater fluidly connects the water separator with the first turbine.

3. The system of claim 2, wherein the moisture removed from the compressed air flows through the reheater before flowing through the defroster.

4. The system of claim 2, wherein the reheater heats the moisture.

5. The system of claim 1, wherein the water separator is configured to remove moisture from the compressed air downstream from the condenser, wherein the moisture removed from the compressed air flows through the evaporator before flowing through the defroster.

6. The system of claim 5, wherein the evaporator heats the moisture.

7. The system of claim 5, further comprising:
a heat exchanger that receives the compressed air from the compressor and cools the compressed air, the heat exchanger positioned upstream of the evaporator.

8. The system of claim 7, further comprising:
a reheater that transfers heat between a cooled compressed air flowing from the evaporator to the water separator and a dried air flowing from the water separator to the first turbine.

9. The system of claim 8, further comprising:
a valve positioned between the compressor and the evaporator, the valve controlling a flow of the compressed air from the compressor to the evaporator.

10. The system of claim 9, wherein the valve is movable between a first position at which the compressed air from the compressor flows through the evaporator and the reheater and a second position at which the compressed air from the compressor bypasses the evaporator and the reheater.

11. The system of claim 1, further comprising:
a drain that receives the melted particulate matter from the defroster.

12. An aircraft, comprising:
a fuselage;
a pair of wings extending outward from the fuselage;
a gas turbine engine configured to generate thrust to propel the aircraft;
an auxiliary turbomachine including a compressor, a first turbine, and a second turbine, wherein the compressor is configured to receive air bled from a gas turbine engine;
an evaporator disposed downstream from and fluidly coupled to the compressor;
a condenser disposed downstream from the evaporator and in fluid communication with the compressor via the evaporator, wherein the condenser is disposed downstream from and in fluid communication with the first turbine, and wherein the condenser is disposed upstream from and in fluid communication with the second turbine;
a water separator disposed downstream from the condenser, wherein the water separator is fluidly connected to the evaporator via the condenser; and
a defroster disposed downstream from the second turbine, wherein the defroster is in fluid communication with the water separator via the evaporator.

13. The aircraft of claim 12, further comprising:
a reheater that transfers heat between the compressed air flowing from the compressor to the water separator and dried air flowing from the water separator to the first turbine.

14. The aircraft of claim 12, further comprising:
a thermal load, wherein air exiting the defroster is routed to the thermal load.

15. The aircraft of claim 12, further comprising:
a drain that receives the melted particulate matter from the defroster.

* * * * *